(12) United States Patent
Stoupis et al.

(10) Patent No.: US 7,154,722 B1
(45) Date of Patent: Dec. 26, 2006

(54) LOOP CONTROL FOR DISTRIBUTION SYSTEMS

(75) Inventors: James D. Stoupis, Raleigh, NC (US); Marina V. Graham, Raleigh, NC (US); Gregory J. Grote, Jefferson City, MO (US)

(73) Assignee: ABB Technology AG, Zurich (CH)

( * ) Notice: Subject to any disclaimer, the term of this patent is extended or adjusted under 35 U.S.C. 154(b) by 214 days.

(21) Appl. No.: 09/946,232

(22) Filed: Sep. 5, 2001

(51) Int. Cl.
*H02H 3/24* (2006.01)
*H02H 3/36* (2006.01)
*H02H 7/26* (2006.01)

(52) U.S. Cl. ............... 361/62; 361/66; 361/67; 361/68; 361/69; 307/19; 307/29

(58) Field of Classification Search ............... 361/61, 361/67; 307/29, 17, 19, 9.1, 10.8
See application file for complete search history.

(56) References Cited

U.S. PATENT DOCUMENTS

| | | | | |
|---|---|---|---|---|
| 3,210,750 A | * | 10/1965 | Leonard | 340/650 |
| 3,909,677 A | * | 9/1975 | McClain | 317/29 R |
| 3,970,898 A | * | 7/1976 | Baumann et al. | 317/25 |
| 4,384,213 A | * | 5/1983 | Bogel | 307/64 |
| 5,502,340 A | * | 3/1996 | Schuster | 307/87 |
| 5,973,899 A | * | 10/1999 | Williams et al. | 361/72 |
| 6,292,340 B1 | * | 9/2001 | O'Regan et al. | 361/78 |
| 6,341,054 B1 | * | 1/2002 | Walder et al. | 361/66 |
| 6,347,027 B1 | * | 2/2002 | Tracey et al. | 361/64 |
| 6,392,857 B1 | * | 5/2002 | Leiloff et al. | 361/80 |
| 6,496,342 B1 | * | 12/2002 | Horvath et al. | 361/65 |

OTHER PUBLICATIONS

Instruction Book, IB38-755-1, May 1999, ABB Power T&D Company, Inc.*

* cited by examiner

*Primary Examiner*—Brian Sircus
*Assistant Examiner*—Zeev Kitov
(74) *Attorney, Agent, or Firm*—Paul R. Katterle

(57) ABSTRACT

The invention contemplates a technique for providing loop control on a faulted overhead or underground loop system, while preventing restored current from being fed or back fed into the fault. In particular, the invention provides a method, device, and system for restoring power to a faulted loop distribution system. The inventive method includes detecting a fault on the loop distribution system, interrupting current on the faulted part of the loop distribution system, isolating the faulted part of the loop distribution system from an unfaulted part of the loop distribution system, restoring current to the unfaulted part of the loop distribution system, and preventing the current from flowing to the faulted part of the loop distribution system. The method may further include providing the current to a load.

13 Claims, 9 Drawing Sheets

LOOP CONTROL FOR DISTRIBUTION SYSTEMS

TECHNICAL FIELD

The invention generally relates to the field of controlling faults on electrical power systems. More particularly, the invention relates to providing loop control for electrical distribution systems.

BACKGROUND OF THE INVENTION

The electrical power network is composed of various sections and components, including numerous transmission and distribution networks, each operating at different voltage levels. Each part of the power network must be protected against electrical faults and consequently short circuits that could cause a collapse of the network, serious and expensive equipment damage, and personal injury. Protective devices, including circuit breakers and reclosers controlled by relays are located throughout the various parts of the power network to locate and attempt to isolate the faults as they occur.

One particular portion of the power network often is referred to as the "loop." The loop refers to the final portion of the electrical power system that connects the consumers to the distribution system. Often, protection schemes referred to as "loop control" are directed to this portion of the electrical network. To date, loop control has been accomplished on overhead power systems using reclosers that are located beside the electrical transformers located atop electrical poles. Reclosers break the larger portions of the power network into smaller sections by automatically isolating faults and restoring power to the unfaulted sections. For example, if lightning created a fault on the power system, a recloser or group of reclosers will open for a preprogrammed time before reclosing automatically (i.e., auto-reclose) once the fault is cleared, so as to restore power to the faulted section.

One drawback of using reclosers to clear faults is that often power is reclosed into the fault. In particular, because reclosers automatically close after a predetermined period of time, without knowing whether the fault has been cleared, current may be restored to the faulted section even though the fault remains. Providing current to the faulted section, often referred to as "banging the cable," causes damage to the cable by promoting a dangerous overcurrent situation. Over time, the insulation and conductivity of the "banged" cable may be diminished to the point that the cable is incapable of carrying its rated current, and must therefore be replaced.

In an overhead environment, where the damaged loop cables are readily accessible, "banging the cable" (and thus having to replace the cable over time) is considered a worthwhile tradeoff to more expensive fault-protecting alternatives. However, in an underground environment, where the damaged loop cables are buried many feet below the ground such that replacing a damaged cable is an expensive undertaking, banging the cable is not a viable alternative. Accordingly, for underground loop systems, which recently have become more widely used than their overhead counterparts, automatic loop control (e.g., using reclosers) is not a viable option. Instead, to date, underground loop systems have tended to use non-fault-interrupting devices, called load break switches.

A load break-switching device is a manually operated device capable of interrupting supply on a distribution network while load current is flowing. A load break device, however, is not designed to interrupt fault currents, but to simply redirect a power source to restore supply to customers. As a result, a load break system requires a line crew to go into the field, locate and clear the fault by manually opening the load break switch. Alternatively, underground loop systems may employ sophisticated point-to-point communication systems that permit a faulted section of the loop to communicate fault-based data to all of the un-faulted section. However, these point-to-point communication systems are complicated and expensive, especially in the underground environment.

Therefore, a need exists to provide efficient and cost-effective loop control for electrical distribution systems.

SUMMARY OF THE INVENTION

The invention contemplates a technique for providing loop control on a faulted overhead or underground loop system, while preventing restored current from being fed or back fed into the fault. In particular, the invention provides a method, device, and system for restoring power to a faulted loop distribution system. The inventive method includes detecting a fault on the loop distribution system, interrupting current on the faulted part of the loop distribution system, isolating the faulted part of the loop distribution system from an unfaulted part of the loop distribution system, restoring current to the unfaulted part of the loop distribution system, and preventing the current from flowing to the faulted part of the loop distribution system. The method may further include providing the current to a load. Also, the restored current may be provided from another source, or from the same source. In addition, at least one fault interrupter may be used to interrupt the current, and to prevent the flow of current to the faulted part of the loop distribution system using at least one fault interrupter.

The foregoing and other aspects of the invention will become apparent from the following detailed description of the invention when considered in conjunction with the accompanying drawings.

BRIEF DESCRIPTION OF THE DRAWINGS

Other features of the invention are further apparent from the following detailed description of the embodiments of the invention taken in conjunction with the accompanying drawings, of which.

DETAILED DESCRIPTION OF THE INVENTION

Overview of Electric Power Transmission System

Figure 1:
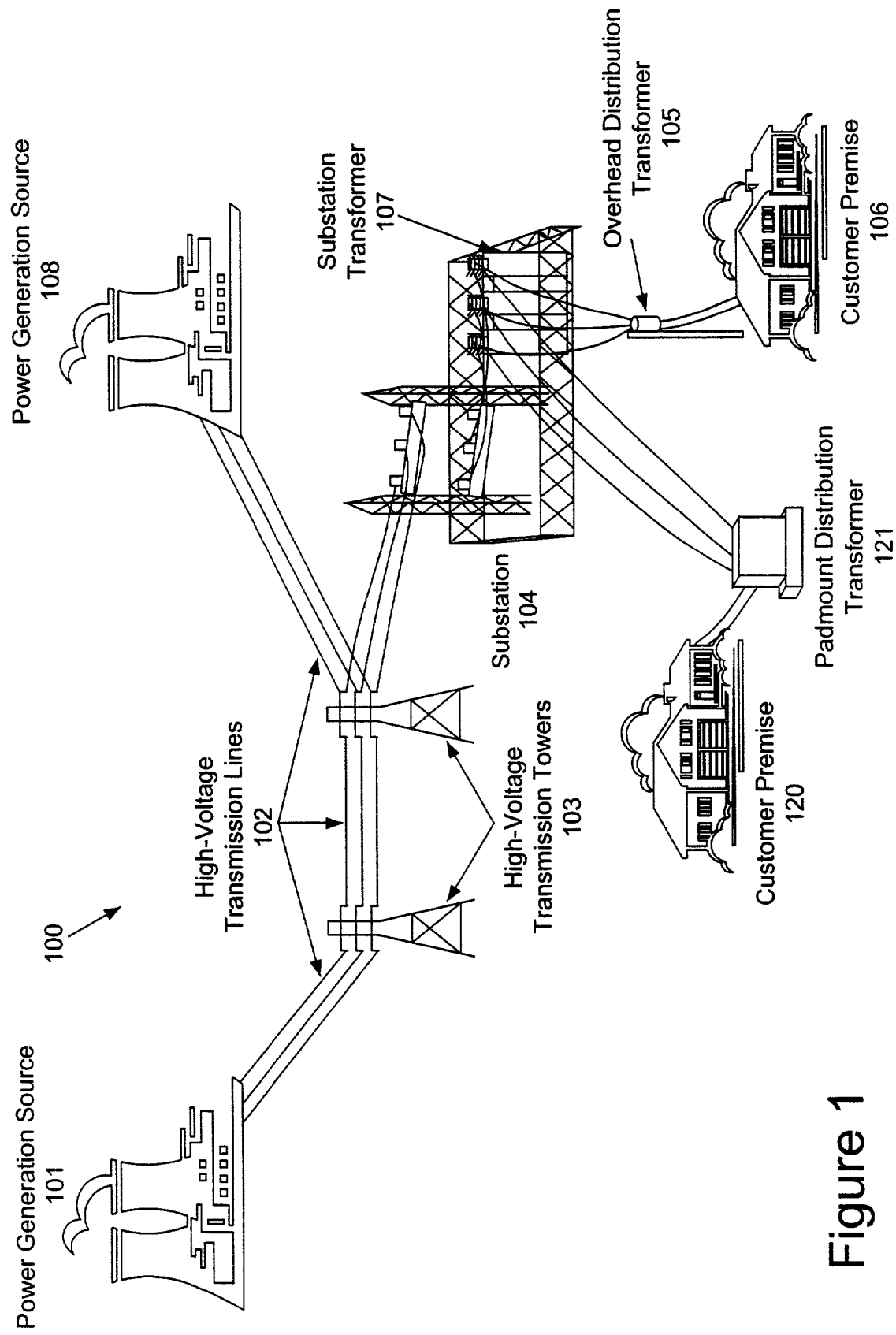
FIG. 1 is a block diagram of an electric power transmission system.

FIG. 1 is a block diagram of an electric power transmission system 100. Generally, electric power transmission system 100 has three major components: the generating facilities that produce the electric power, the transmission network that carries the electric power from the generation facilities to the distribution points, and the distribution system that delivers the electric power to the consumer. As shown in FIG. 1, a power generation source 101 is a facility that produces electric power. Power generation source 101 includes a generator (not shown) that creates the electrical power. The generator may be a gas turbine or a steam turbine operated by burning coal, oil, natural gas, or a nuclear reactor, for example. In each case, power generation source 101 provides a three-phase alternating current (AC) power. The AC power typically has a voltage as high as approximately 25,000 volts.

A transmission substation (not shown) then increases the voltage from power generation source 101 to high-voltage levels for long distance transmission on high-voltage transmission lines 102. Typical voltages found on high-voltage transmission lines 102 range from 69 to 800 kilovolts (kV). High-voltage transmission lines 102 are supported by high-voltage transmission towers 103. High-voltage transmission towers 103 are large metal support structures attached to the earth, so as to support the transmission lines and provide a ground potential to system 100. High-voltage transmission lines 102 carry the electric power from power generation source 101 to a substation 104. A typical maximum distance between power generation source 101 and substation 104 is approximately three hundred miles. High-voltage transmission lines 102 between power generation source 101 and substation 104 typically are referred to as the "grid."

In three-phase voltage systems, typical for high-voltage transmission lines, there is one individual conductor for each phase. Therefore, there are three conductors for each three-phase high-voltage "circuit."

Generally, substations act as a distribution point in system 100 and a point at which voltages are stepped-down to reduced voltage levels. Substation 104 converts the power on high-voltage transmission lines 102 from transmission voltage levels to distribution voltage levels. In particular, substation 104 uses a transformers 107 that step down the transmission voltages from the 69–800 kV level to distribution voltages that typically are less than 35 kV. In addition, substation 104 may include an electrical bus (not shown) that serves to route the distribution level power in multiple directions. Furthermore, substation 104 often includes circuit breakers and switches (not shown) that permit substation 104 to be disconnected from high-voltage transmission lines 102, when a fault occurs on the lines.

Substation 104 typically is connected to an overhead distribution transformer 105 located on a telephone or electric pole, and/or a padmount distribution transformer 121 located on the ground. Padmount distribution transformer 121 provides power to customer premise 120 via underground feeder cables. Voltage levels between substation 104 and overhead distribution transformer 105 and/or padmount distribution transformer 121 typically are less than 40 kV. Overhead distribution transformer 105 steps down the voltage to levels required by a customer premise 106 and padmount distribution transformer 121 steps down the voltage levels required by customer premise 120, for example. Such voltages typically range from 120 volts to 480 volts. Also, overhead distribution transformer 105 and padmount distribution transformer 121 may function to distribute one, two or all three of the three phase currents to customer premise 106 and customer premise 120, respectively, depending upon the demands of the user.

Overview of Loop Control

One particular portion of power transmission system 100 often is referred to as the "loop." The loop refers to a certain configuration in the final portion of the electrical power system that connects the consumers to the distribution system. In particular, the loop configuration provides a primary source of power and a backup source of power, both of which may be fed from the same source but from different feeders. On overhead systems, loop control schemes employ reclosers that are located beside the electrical transformers, located atop the electrical poles. The reclosers operate to break the larger portions of the power network into smaller sections by automatically isolating faults and restoring power to the unfaulted sections. Certain protection schemes called "loop control" or restoration schemes are directed to operating the reclosers so as to protect the loop.

Power distribution operators have developed restoration schemes to automate the process of reanimating a failed portion of the loop. These schemes typically exploit the intelligence found in existing loop equipment. Specifically, equipment such as control devices for reclosers comprise a central processing unit (CPU), memory storage means, a power supply module, a communication module, a digital input/output module, and PT/CT (Potential Transformer/Current Transformer) A/D (Analog-to-Digital) module. A set of instructions indicative of a power restoration scheme may be stored in the memory storage means of the control device. Accordingly, the restoration scheme may be active when the reclosers of a loop system act in accordance to roles that have been predefined by the stored instructions. For example, a loop may comprise a number of reclosers having a predefined configuration (e.g., configuration as defined by the restoration scheme) that allow the flow of current along the loop. When a fault occurs in the loop, the reclosers act in accordance to the predefined instructions to isolate the fault and attempt to energize the remaining undisturbed portion of the loop.

Typically, during a system disturbance or fault, large increases in current occur, called overcurrents. Sensing the overcurrent, the recloser will open and stop current flow in order to protect its portion of the loop. Because many fault conditions are temporary, the recloser is designed to close after a short period of time, thereby re-establishing normal current flow. For example, during a thunderstorm, if lightning were to strike the distribution system, the power to one's home may be disrupted for few seconds causing lights and appliances to turn off (recloser opening), then on (recloser closing). Once the recloser closes, if it senses the continued presence of increased current, it will again open. Such cycling between open and closed may occur a number of times before the recloser remains open. When the recloser remains open, "lockout" occurs, a state in which the temporary fault becomes a permanent fault. However, during the intermittent closing and opening of the recloser, supply current from the unfaulted side of the loop is carried into the faulted portion of the network. This situation is referred to as "reclosing into the fault" or "banging the cable."

Figure 2:
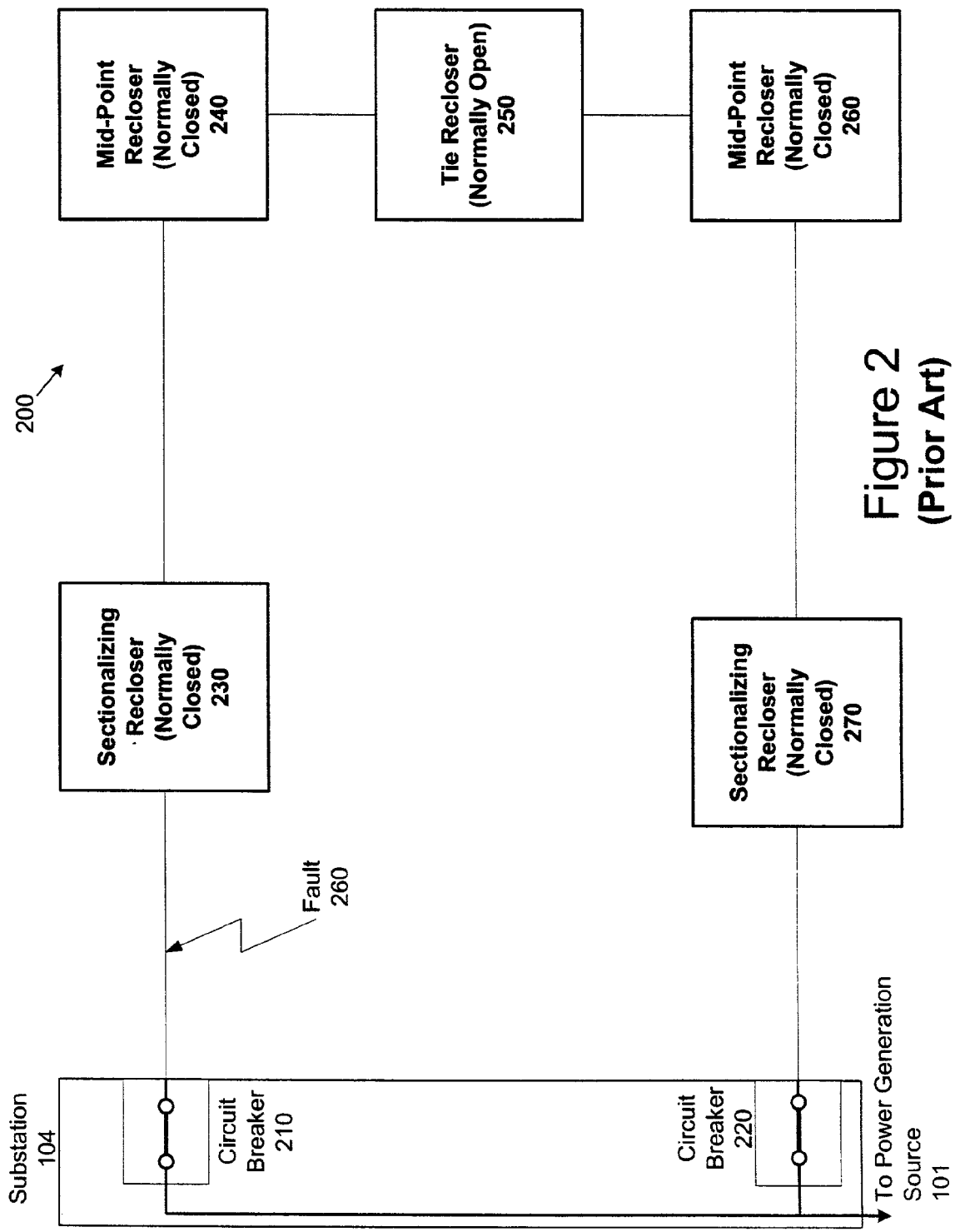
FIG. 2 is a block diagram of a prior art restoration scheme for an overhead loop system.

FIG. 2 is a block diagram of a prior art restoration scheme for an overhead loop system. As shown in FIG. 2, loop system 200 comprises substation 104 with circuit breaker 210 and a circuit breaker 220. A circuit is completed from circuit breaker 210 to circuit breaker 220 as circuit breaker 210 is connected to a sectionalizing recloser 230. In turn, sectionalizing recloser 230 is connected to a mid-point recloser 240 that is connected to a tie recloser 250. Tie recloser 250 is connected to a mid-point recloser 260, which is connected to a sectionalizing recloser 270. Sectionalizing recloser 270 completes the loop by connecting to circuit breaker 220. Further, a fault 260 may occur in loop system 200 such that current is interrupted between circuit breaker 210 and the rest of the power distribution system 200 circuit. The area where the fault occurs is referred to as the "fault zone."

Generally, sectionalizing reclosers 230 and 270 have the characteristics of being placed close to the power station (e.g., substation 104). Tie recloser 250 may be a normally-open protection device that closes when it senses a loss of current or an overcurrent, caused by a fault. In fact, in an underground loop system it may be desirable to use a normally-open switch programmed as such, instead of a tie recloser. Sectionalizing reclosers 230 and 270 and mid-point reclosers 240 and 260 may be normally-closed devices that open when they sense a loss of voltage or an overcurrent, caused by a fault.

In operation, sectionalizing reclosers 230 and 270 trip and lock out (e.g., remain open) after a programmed time upon the loss of voltage from a sensing transformer (not shown) located within each sectionalizing recloser. Comparatively, tie recloser 250 is placed between cooperating circuits (e.g., between two power sources) and operates in a normally open state (e.g., not allowing current to flow through).

In operation, when fault 260 occurs tie recloser 250 closes (e.g., allowing current to flow through) after a programmed time. Mid-point reclosers 240 and 260 are placed between sectionalizing reclosers and tie reclosers. Further, during fault-free power distribution system operation, mid-point reclosers 240 and 260 remain closed. Mid-point reclosers 240 and 260 monitor for fault conditions using a voltage-sensing transformer (not shown). If there is no voltage, mid-point reclosers 240 and 260 change their minimum trip values as they prepare to be back-fed from an alternative source (e.g., if a fault occurs between circuit breaker 210 and mid-point recloser 240, mid-point recloser 240 will expect to be fed from circuit breaker 220).

When fault 260 occurs between substation 104 and sectionalizing recloser 230, circuit breaker 210 recognizes the fault and locks out. Using a voltage-sensing transformer (not shown) sectionalizing recloser 230 will recognize the loss of voltage and automatically open for a predetermined time period, isolating the faulted zone within the circuit. Mid-point recloser 240 automatically changes its trip settings to allow proper operation during a back-feed condition from tie recloser 250. In conjunction, tie recloser 250 will recognize a loss of current on circuit breaker 210 portion of loop system 200. After a predetermined time delay, tie recloser 250 will close to establish service back to sectionalizing recloser 230. Tie recloser 250 also changes its operation to "one-shot" to lockout in case it may be closing into a fault. After a programmed time, tie recloser 250 changes back to its original settings (e.g., three tries until lockout).

The above restoration scheme provides a viable method to restore power on a faulted loop system. However, this scheme, like other loop control schemes, requires that back-up current be reclosed into the fault. As such, the conductors subject to the fault may be unnecessarily subjected to current while the fault condition persists.

Loop System Restoration Scheme

Figure 3A:
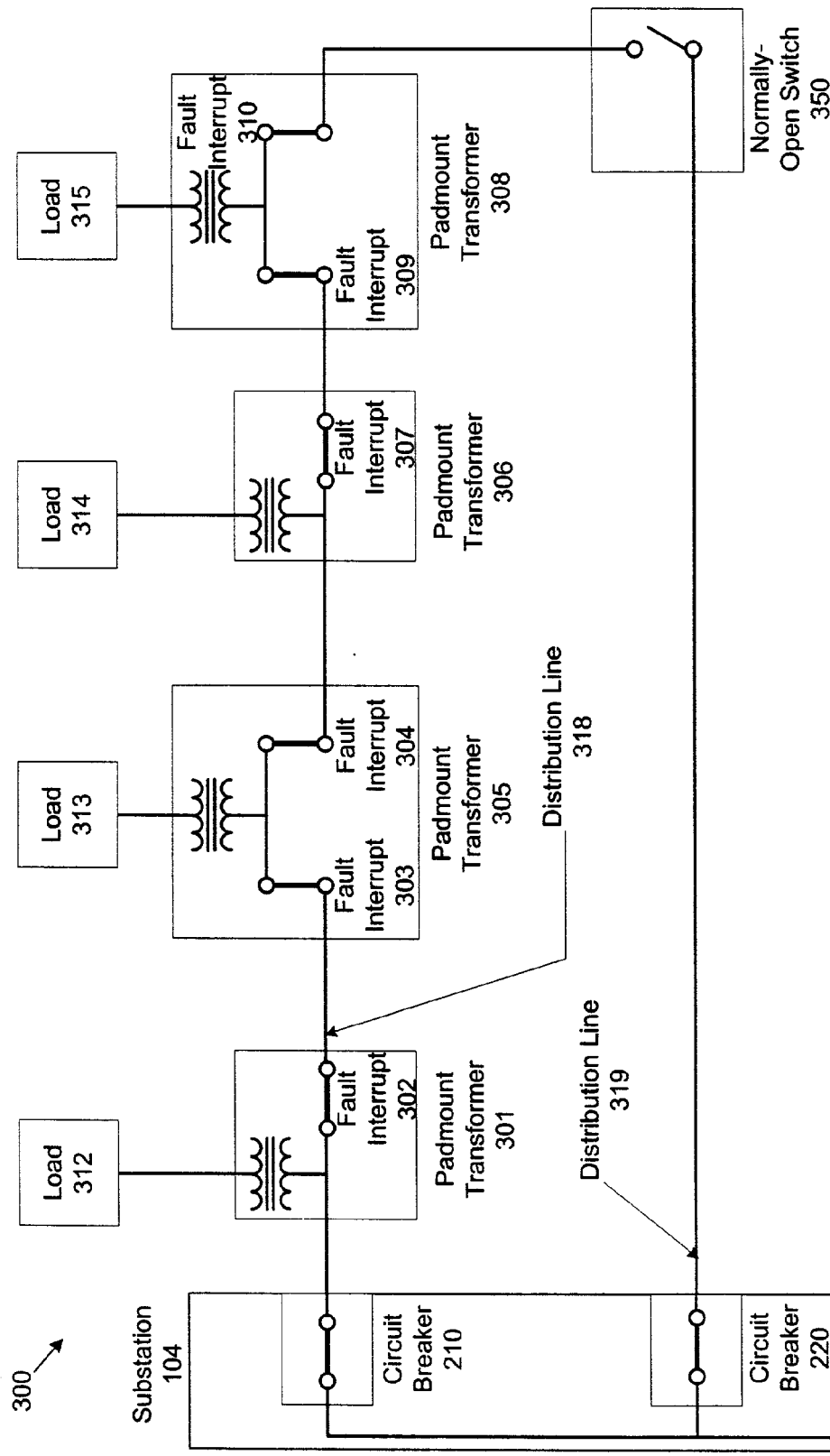
FIGS. 3A through 3F provide a block diagram of a restoration scheme, according to the invention.

FIGS. 3A through 3F provide a block diagram of a restoration scheme, according to the invention. FIG. 3A is a block diagram of a system for providing a loop control scheme. FIGS. 3B through 3F provide a block diagram illustrating how the system reacts to various faults within the system. It should be appreciated that FIGS. 3A through 3F provide just one example of a system contemplated by the invention. Accordingly, the invention is not limited to the system illustrated in FIGS. 3A through 3F, but as will be discussed, other systems may comprise the inventive method.

As shown in FIG. 3A, a substation 104 includes a circuit breaker 210 and a circuit breaker 220. As discussed with reference to FIG. 1, substation 104 receives power from power generation source 101. Circuit breakers 210 and 220 feed two ends of a loop that begins at substation 104 and meets at normally-open switch 350. Although system 300 shows the loop as being fed from a common power distribution point (e.g., substation 104), it should be appreciated that the invention equally applies to a loop that is fed from two or more individual power distribution points or individual power generation sources. For example, the invention applies to a loop that is fed from substation 104 and from another substation (not shown).

The terms "upstream" and "downstream" will be used throughout to describe the flow of current in the loop and to describe the location of a particular component with respect to another component in the loop. In particular, the term "upstream" will be used to describe a loop component that is closer to the source of power (e.g., substation 104) than another component, and the term "downstream" will be used to discuss a loop component that is further from the source of power than another component.

As shown in FIG. 3A, circuit breaker 210 is coupled to a padmount transformer 301, and padmount transformer 301 provides power to a load 312. Padmount transformer 301 is coupled to a padmount transformer 305, and padmount transformer 305 provides power to a load 313. Padmount transformer 305 is coupled to a padmount transformer 306, and padmount transformer 306 provides power to a load 314. Padmount transformer 306 is coupled to a padmount transformer 308, and padmount transformer 308 is coupled to a load 315.

Each of padmount transformers 301, 305, 306, and 308 include certain fault interrupters configured so as to provide loop control to system 300, while preventing back-up current from being fed into the fault. In particular, padmount transformer 301 and padmount transformer 306 include fault interrupter 302 and fault interrupter 307, respectively. Fault interrupters 302 and 307 are in series with distribution feeder 318. Fault interrupters 302 and 307 are set to open (i.e., stop the flow of current) when a sensing transformer (not shown) senses a fault that occurs directly on the downstream side of padmount transformers 301 and 306.

Padmount transformer 305 includes two fault interrupters, 303 and 304. Fault interrupter 303 and 304 are in series with distribution line 318. Unlike padmount transformer 301 and 306, however, padmount transformer 305 feeds its load 313 from between fault interrupters 303 and 304. Similarly, padmount transformer 308 includes fault interrupter 309 and 310. Also, padmount transformer 308 feeds its load 315 from between fault interrupter 309 and fault interrupter 310. Fault interrupters 303, 304, 309, and 310 having sensing transformers (not shown) that operate to open the fault interrupters when a loss of voltage appears on their downstream or on their upstream side. Such a loss of voltage may be created by a fault that appears on the downstream or upstream side of the fault interrupter. Alternatively, fault interrupters 303 and 309 may be set up to open on faults that appear on their upstream side, and fault interrupters 304 and 310 may be set to trip on faults that appear on their downstream side. In either case, as will be discussed with reference to FIGS. 3B through 3F, allowing fault interrupters 303, 304, 309, and/or 310 to open on a loss of voltage on their downstream or upstream sides, facilitates the configuration of system 300 for providing loop control without feeding or back feeding current into the fault.

Fault interrupters 301, 303, 304, and 309 may be controlled by commercially available devices, or commercially available devices modified to operate as described. For example, fault interrupters 301, 303, 304, and 309 may be controlled by any one of the following models available from ABB Incorporated: a Power Control Device (i.e., recloser controller) PCD2000, or an MAV3 magnetically actuated vacuum interrupter. These commercially available devices may be modified to enable the functionality described. In particular, each device should have overcurrent protection and loop control functionality. The overcurrent protection may be based on a series of preset thresholds. Depending on the magnitude of the threshold, the time it takes the device to respond by tripping may be varied. For example, a threshold set at twelve hundred amperes may trip twice as fast as a threshold set at six hundred amperes.

Loop control functionality may be built into each of the commercially available devices, or may be provided via an add-on loop control module. The loop control module operates to sense the voltage and/or current conditions on the upstream and downstream side of the device, as required. Also, the loop control functionality provides each device with "alternate settings," such that it can respond to certain fault conditions in a particular way. For example, the loop control functionality may require the fault interrupter that has sensed a loss of voltage on its upstream side, to monitor current flow in the opposite direction and sense for a loss of voltage on its downstream side. Also, because current is being back fed from the other side of the loop, the alternate settings functionality may permit a device to have a trip time that is faster or slower than its adjacent component, depending upon whether the device becomes an upstream or downstream device. Using FIG. 3A as an example, the control device at padmount transformer 308 may be configured for alternate settings once fault interrupter 309 has opened for an upstream fault. Therefore, fault interrupter 310 would continue to protect for transformer faults and/or provide backup protection for the fuse element in padmount transformer 308. Although not discussed specifically, similar alternate settings are available at the other fault interrupters.

FIG. 3A shows the operation of system 300 without any faults located on the system. In particular, circuit breaker 210 is in a closed position and feeds power from power generation source 101 to padmount transformer 301 via distribution line 318. Padmount transformer 301 therefore feeds power to load 312. Because fault interrupter 302 is closed, power is carried onto padmount transformer 305. Because there is no fault on system 300, fault interrupters 303 and 304 are closed providing power to load 313 and onto padmount transformer 306. Also, because fault interrupter 307 in padmount transformer 306 is in a closed position, power is fed to load 314 and onto power transformer 308. Fault interrupters 309 and 310 are in a closed position, and therefore padmount transformer 308 feeds power to load 315 and to normally-open switch 350. Finally, because in a no-fault condition, circuit breaker 220 is closed power from power generation source 101 is provided to loads (not shown) on distribution line 319.

Although no components or padmount transformers are shown connected to distribution line 319, components typically exist similar to those on distribution line 318. In this case, circuit breaker 220 would be closed to provide power from power generation source 101 to the padmount transformers and corresponding loads located on distribution line 319. However, no components are shown on distribution 319 for the purposes of clarity and brevity.

Although the invention is described with reference to an underground loop system using padmount transformers to provide loop control and to feed power to end-users, it should be appreciated that the invention equally applies to overhead loop systems using pole top transformers, and the like.

Figure 3B:
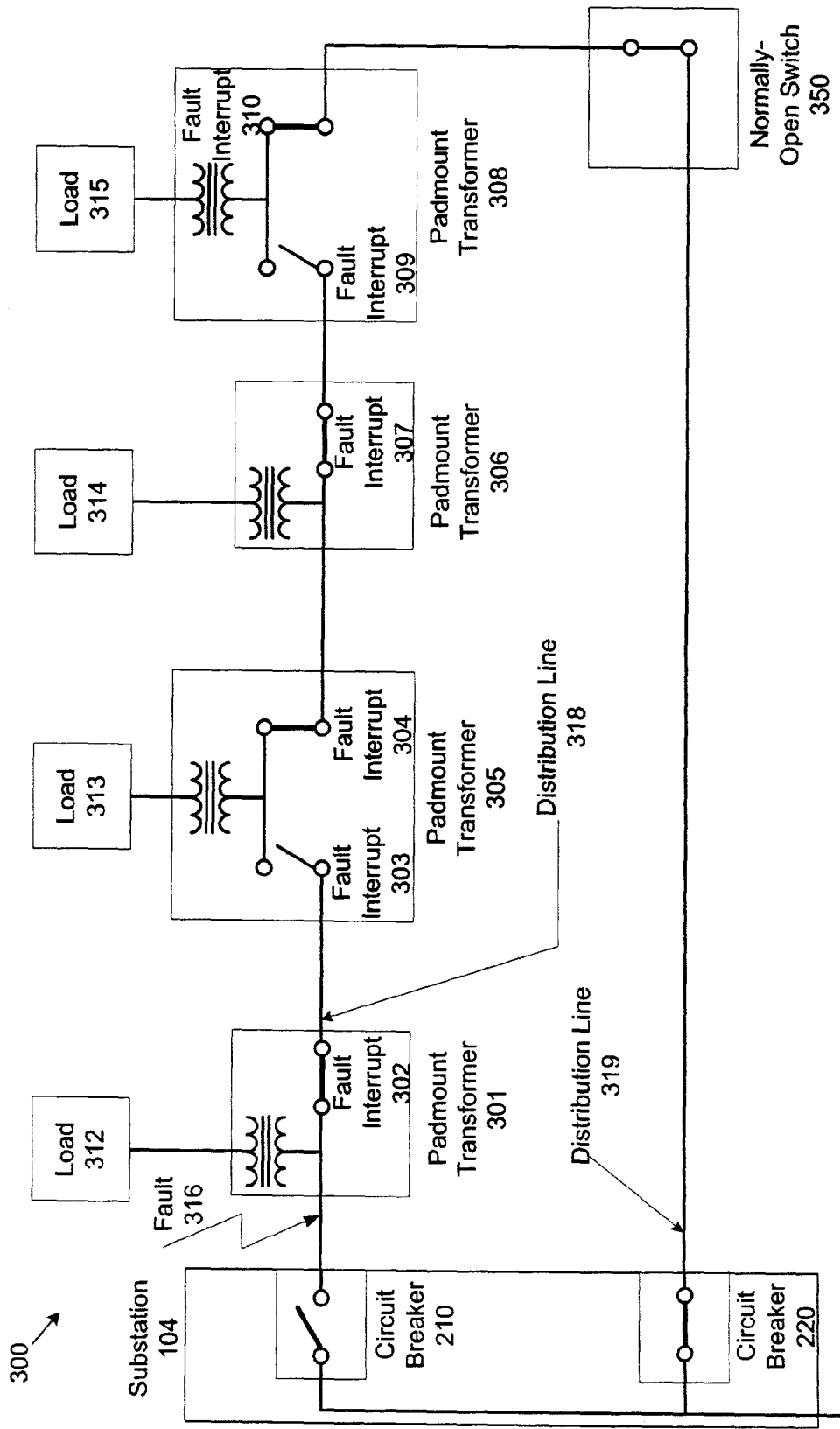

FIGS. 3B through 3F provide block diagrams illustrating how system 300 reacts to faults located within the loop system. As shown in FIG. 3B, fault 316 is located between substation 104 and padmount transformer 301. In operation, when fault 316 appears on distribution line 318 circuit breaker 210 sensing fault 316 on its downstream side opens and locks out. The opening of circuit breaker 210 prevents the flow of current from power generation source 101 via substation 104. In addition, fault interrupter 303 and fault interrupter 309 sensing a loss of three-phase voltage on their upstream sides open and lock out. Normally-open switch 350 senses a loss of voltage on its upstream side and subsequently closes after a time delay. Finally, because circuit breaker 220 is closed power from power generation source 01 is provided to loads (not shown) on distribution line 319.

Therefore, because normally-open switch 350 is closed, power is provided to padmount transformer 308. Even with the presence of fault 316, padmount transformer 308 continues to provide power to load 315, because fault interrupter 310 remains in a closed position. Load 315 is said to be "back fed" power from normally-open switch 350. However, because fault interrupter 309 and circuit breaker 210 are in an open position, loads 312–314 do not receive power. Therefore, system 300 beneficially prevents current flowing through normally-open switch 350 to be fed to fault 316, by opening circuit breaker 210 and fault interrupter 309.

Figure 3C:
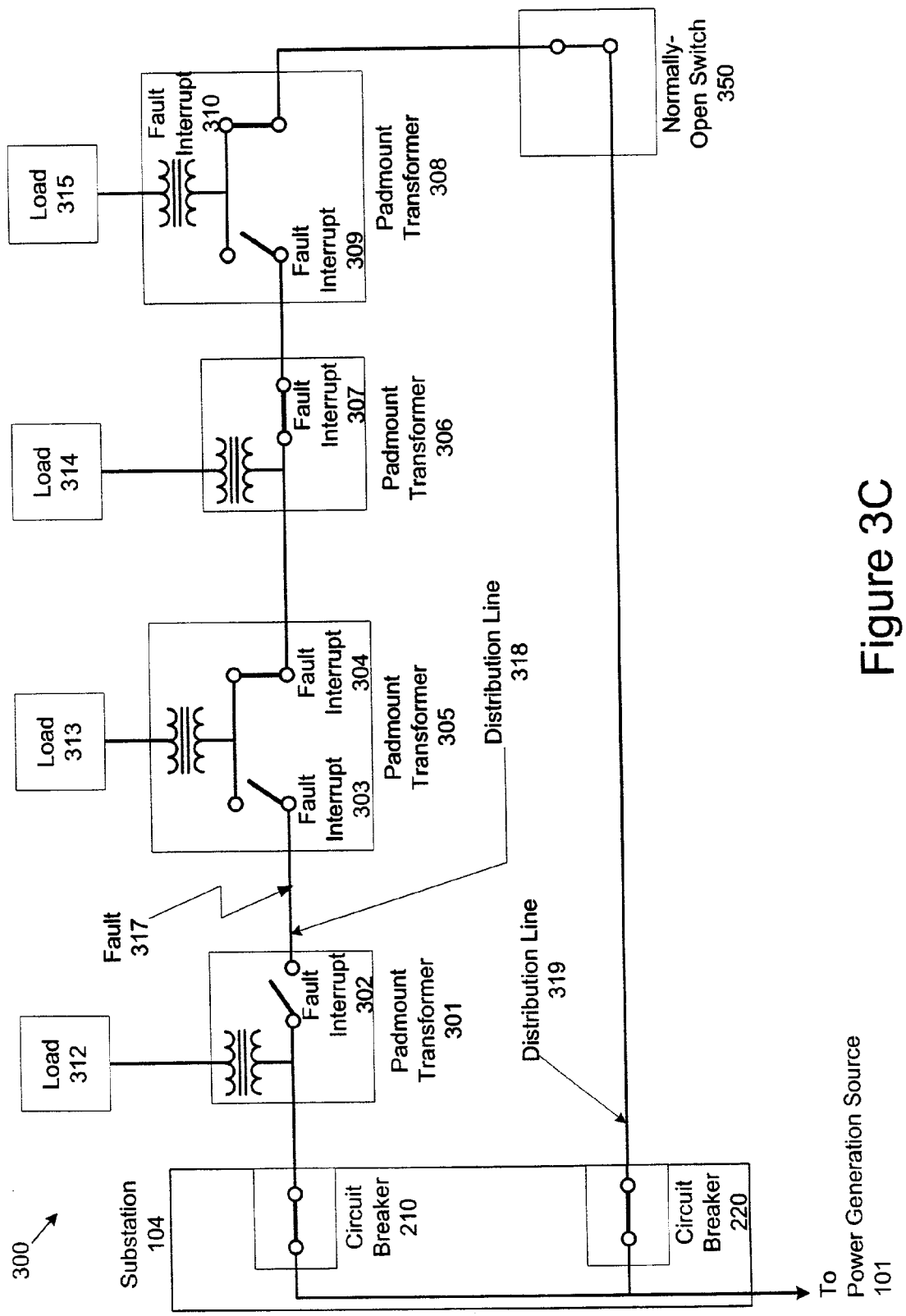

FIG. 3C is a block diagram illustrating how system 300 reacts to a fault 317 located between padmount transformer 301 and padmount transformer 305. As shown in FIG. 3C, fault 317 causes the tripping of fault interrupter 302, which is set to recognize a fault on its downstream side. Also, fault interrupters 303 and 309 sense a loss of voltage on their upstream side and consequently open and lock out. Normally-open switch 350 senses a loss of voltage and closes after a time delay. Finally, because circuit breaker 220 is closed power from power generation source 101 is provided to loads (not shown) on distribution line 319.

Therefore, even under fault 317, power from power generation source 101 is provided to load 315 via closed circuit breaker 220 and normally-open switch 350. Also, load 312 continues to receive power from power generation source 101 via closed circuit breaker 210. However, current from either side of the loop is not fed to fault 317. Therefore, the configuration of system 300 provides power to loads 312 and 315 without feeding or back feeding current into fault 317.

Figure 3D:
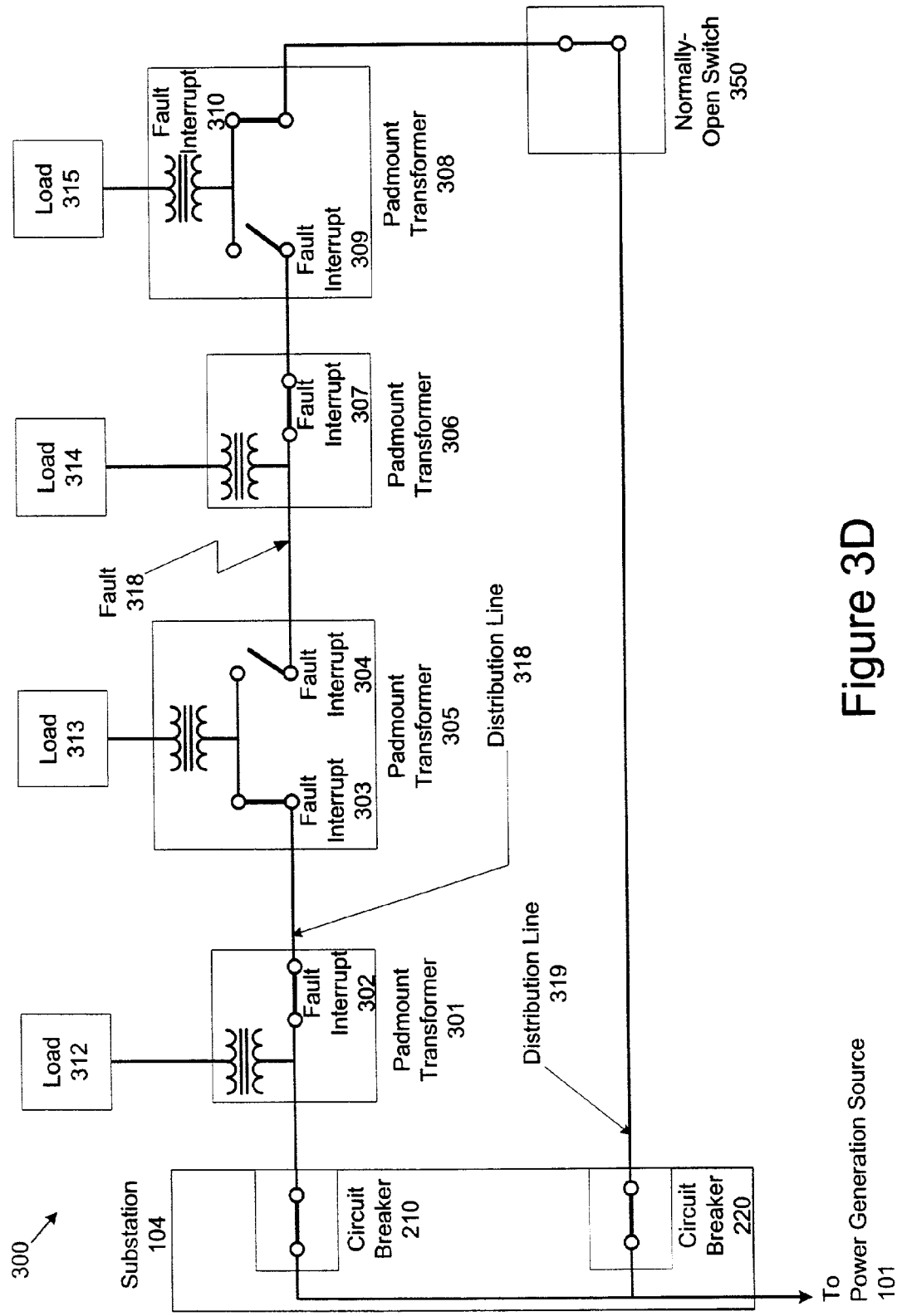

FIG. 3D is a block diagram illustrating how system 300 reacts to a fault 318 located between padmount transformer 305 and padmount transformer 306. As shown in FIG. 3D, fault 318 causes fault interrupter 304 in padmount transformer 305 to sense a loss of voltage on its downstream side, and thus to trip and lock out. Also fault interrupter 309 in padmount transformer 308 senses a loss of voltage and trips and locks out. Normally-open switch 350 senses a loss of voltage and closes after a set time delay.

Therefore, even under fault 318, system 300 continues to provide current to load 315 from power generation source 101 via closed circuit breaker 220 and closed normally-open switch 350. In addition, loads 312 and 313 continue to receive power from power generation source 101 via closed circuit breaker 220 and closed fault interrupters 302 and 303. As a result, system 300 continues to provide current to loads 312, 313, and 315, while beneficially preventing current from being fed or back fed to fault 318.

Figure 3E:
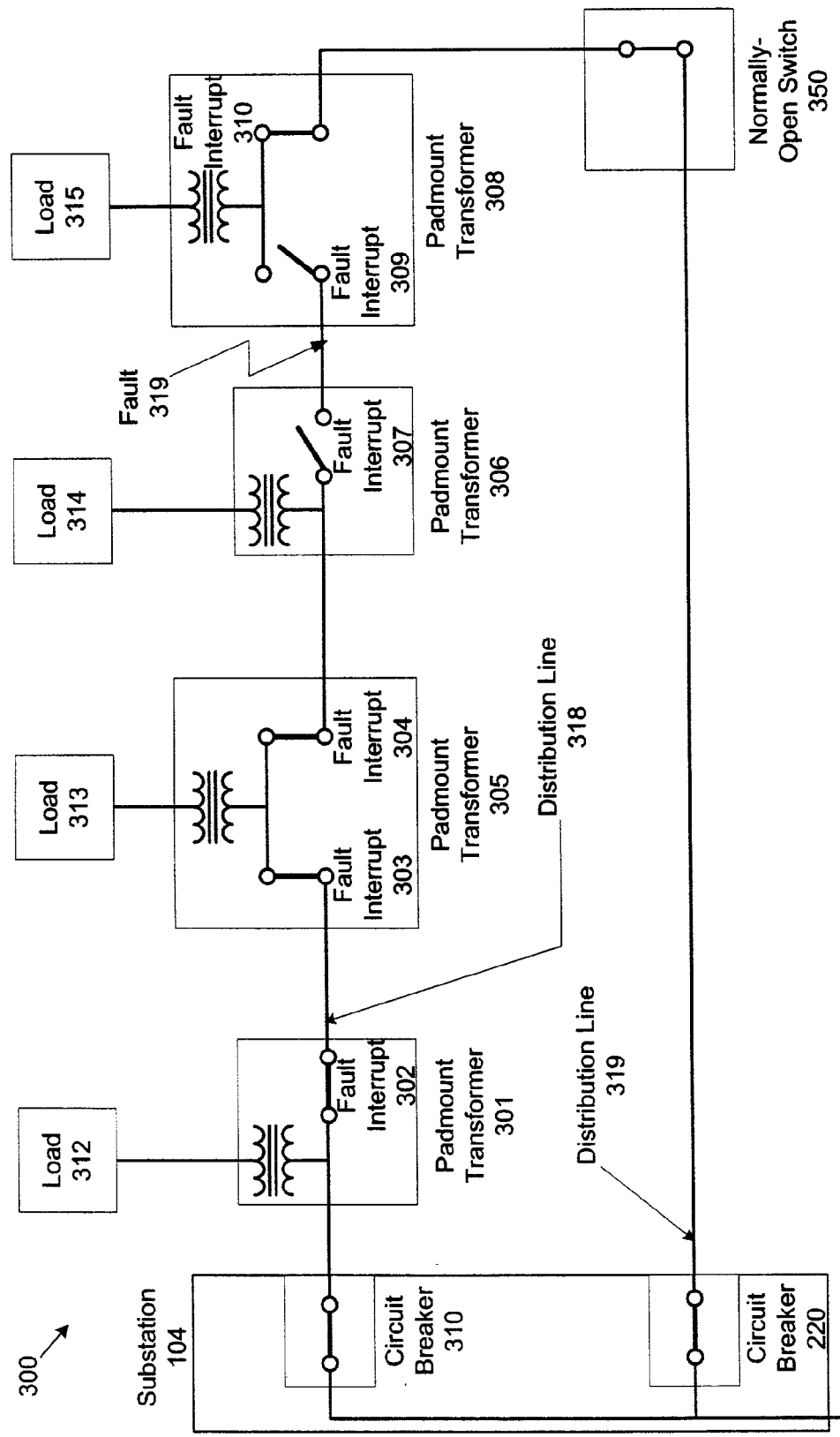

FIG. 3E illustrates how system 300 reacts to a fault 319 located between padmount transformer 306 and padmount transformer 308. As shown in FIG. 3E, fault 319 causes fault interrupter 307 to recognize a fault on its downstream side, and thus open and lock out. Also, fault 319 causes fault interrupter 309 to sense a loss of voltage on its upstream side and to open and lock out. Also, normally-open switch 350 senses a loss of voltage and closes after a set time delay.

Under fault 319 loads 312–315 continue to receive power. In particular, load 315 continues to receive power from power generation source 101 via circuit breaker 220, normally-open switch 350, and fault interrupter 310, which are closed. Also, loads 312–314 continue to receive power from power generation source via closed circuit breaker 220 and closed fault interrupters 302–304. Although system 300 continues to provide power to loads 312–315, system 300 also beneficially prevents current from being fed or back fed into fault 319.

Figure 3F:
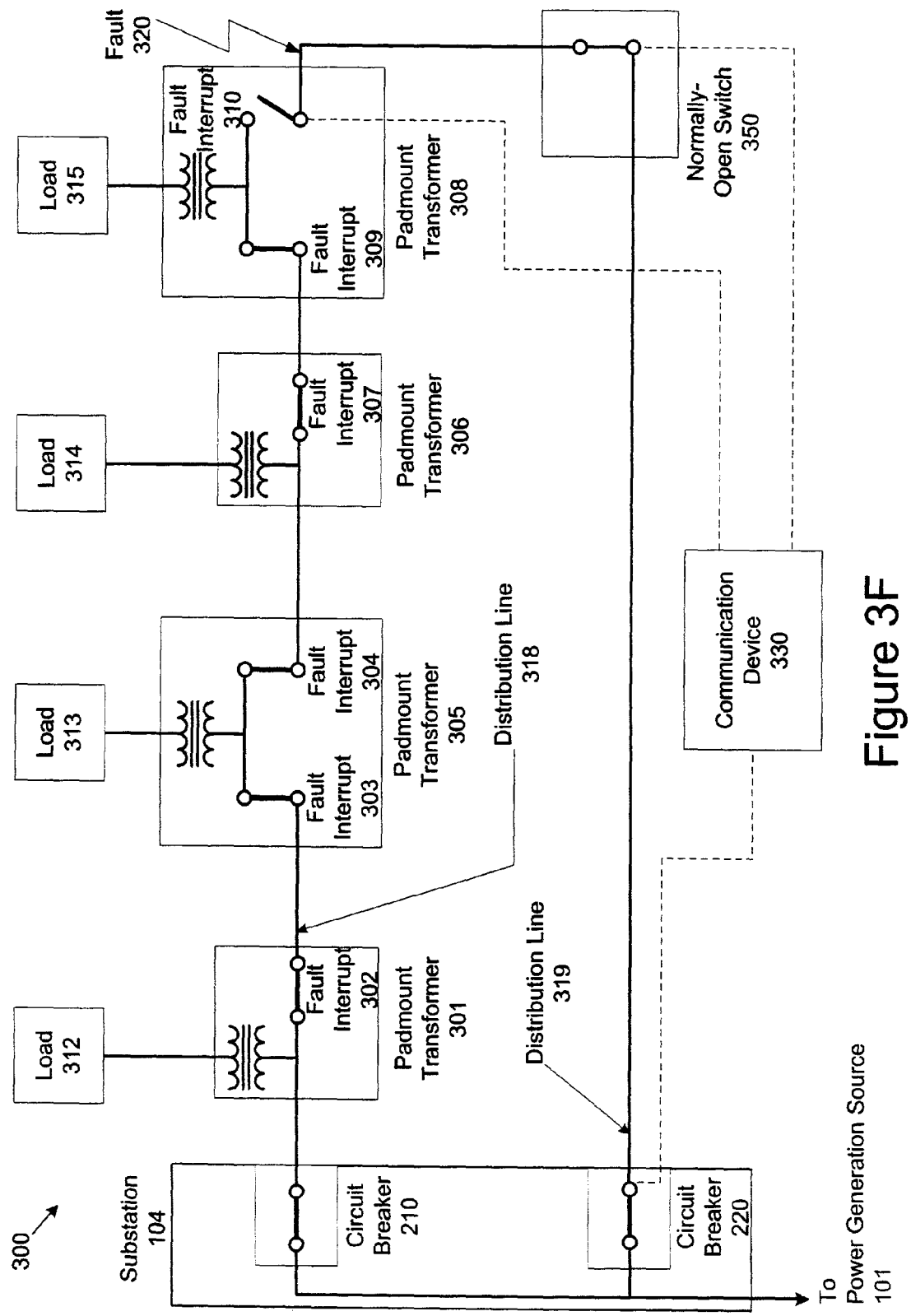

FIG. 3F is a block diagram illustrating how system 300 reacts to a fault 320 located between padmount transformer 308 and normally-open switch 350. As shown in FIG. 3F, fault 320 causes fault interrupter 310 to sense a loss of voltage on its downstream side, and thus trip and lock out. Also, fault 320 causes normally-open switch 350 to sense a loss of voltage and to close after a set time delay. Therefore, loads 312–315 continue to receive power from power generation source 101 via circuit breaker 210 over distribution line 318. In particular, fault interrupters 302–304, 307 and 309 remain closed under fault 320 to provide power to loads 312–315. Accordingly, none of the customers serviced by loop system 300 will lose power.

Unlike the schemes depicted in FIGS. 3B through 3E, however, the closing of normally-open switch 350 causes power to be provided over distribution line 319 from power generation source 101 to fault location 320 via closed circuit breaker 220. Therefore, in order to prevent system 300 from reclosing into fault 320, a communication device 330 may be in communication with fault interrupter 310, normally-open switch 350, and circuit breaker 220.

Communication device 330 permits system to identify that a fault has occurred between padmount transformer 308 and normally-open switch 350. In particular, because fault 320 causes fault interrupter 310 to open, unlike faults 316–319, communication device 330 may receive a signal from fault interrupter 310 indicating that it has opened, and thus that a fault has occurred at fault location 320. As a result, communication device 330 would send a signal to normally-open switch 350 to remain open, so as to prevent current from being sent to fault location 320. Finally, because circuit breaker 220 is closed power from power generation source 101 is provided to loads (not shown) on distribution line 319.

As suggested above, distribution line 319 may have other components and padmount transformers (not shown). Accordingly, it should be appreciated that although not shown in FIG. 3F, fault interrupter 310 may communicate its opening (and thus the occurrence of fault 320) to any component located on distribution line 319, so as to prevent the flow of current to fault 320. Furthermore, because the scheme depicted in FIG. 3F bangs the cable on fault at fault location 320, it may be considered a worthwhile tradeoff to forego providing the communication technique, at the risk of possibily having to replace the portion of cable between normally-open switch 350 and padmount transformer 308. Accordingly, the communication scheme described with reference to FIG. 3F may be optional.

Although not shown in FIGS. 3A–3F, it should be appreciated that an additional protection device, for example a fuse, typically is coupled in series with each of the transformer elements in the padmount transformers. The protection device may protect the components of system 300 from a fault created by each of the transformers located in padmount transformers 301, 305, 306, and 308. Also, although FIGS. 3A through 3F illustrate loop control for single-phase voltage, the invention applies equally to a three-phase voltage configuration. The single-phase voltage configuration is illustrated for the purposes of clarity and brevity.

Figure 4:
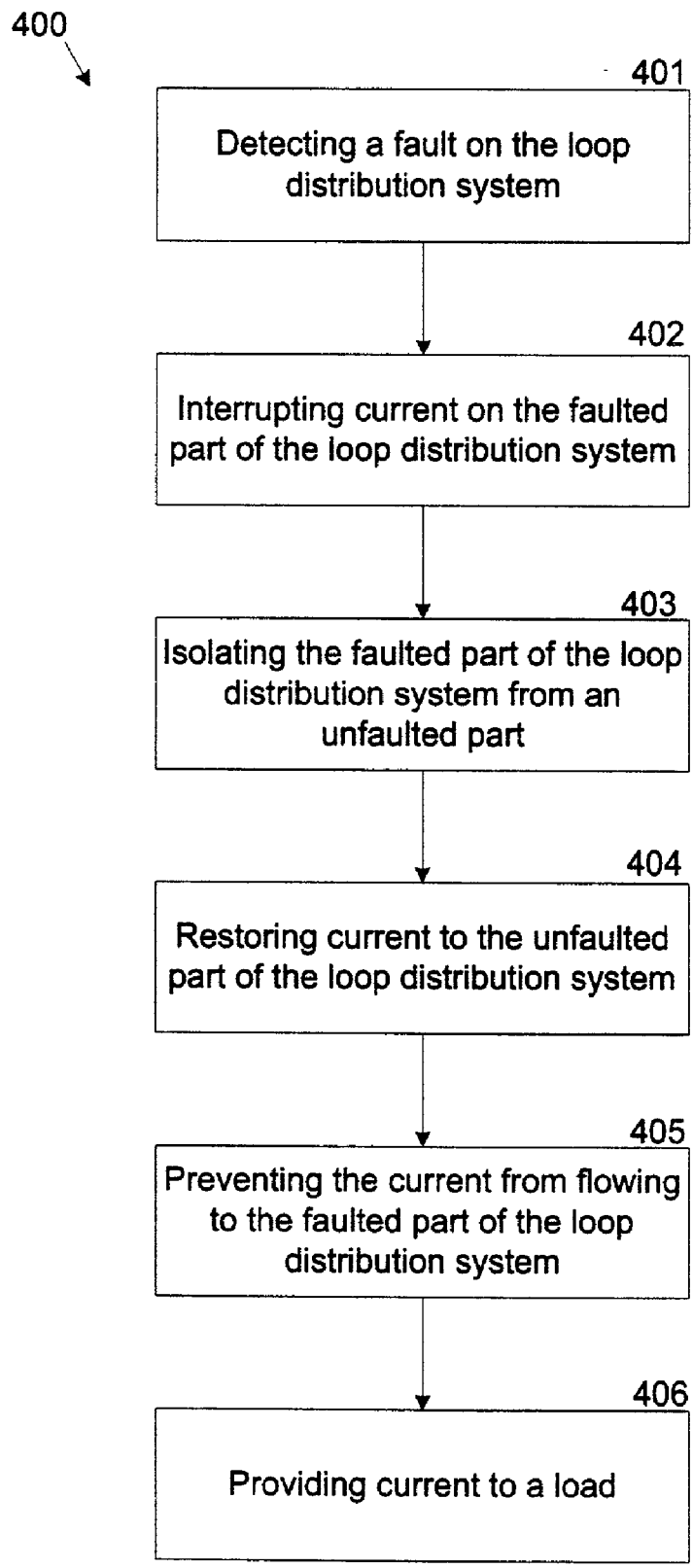
FIG. 4 provides a flow diagram of a method for restoring power to a loop system, according to the invention.

FIG. 4 provides a flow diagram illustrating a method 400 for restoring power to a faulted loop distribution system. As shown in FIG. 4, in step 401, a fault is detected on the loop distribution system. In step 402, current on the faulted part of the loop distribution system is interrupted. In step 403, the faulted part of the loop distribution system is isolated from an unfaulted part of the loop distribution system. In step 404, current is restored to the unfaulted part of the loop distribution system. In step 405, current is prevented from flowing to the faulted part of the loop distribution system. In step 406, the unfaulted part of the loop control system is able to provide current to its loads.

The invention is directed to a method, device, and system for restoring power to a faulted loop distribution system. It is noted that the foregoing examples have been provided merely for the purpose of explanation and are in no way to be construed as limiting of the invention. While the invention has been described with reference to certain embodiments, it is understood that the words which have been used herein are words of description and illustration, rather than words of limitations. For example, although the inventive system was described in the context of single-phase faults, it will be appreciated that the techniques described may be equally applied to three-phase faults. Also, although the invention has been described with reference to underground loop control concerns, it applies equally to an overhead loop system. Also, the configuration provided is just one example of a configuration that is capable of providing loop control without feeding current to the fault.

Further, although the invention has been described herein with reference to particular means, materials and embodiments, the invention is not intended to be limited to the particulars disclosed herein. Rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects. Those skilled in the art will appreciate that various changes and adaptations of the invention may be made in the form and details of these embodiments without departing from the true spirit and scope of the invention as defined by the following claims.

What is claimed is:

1. A power distribution system for supplying power to a first power load and a second power load, said power distribution system comprising:

(a.) first and second power generation sources;

(b.) a first distribution line connected to said first power generation source and said first and second power loads;

(c.) a second distribution line connected to said second power generation source;

(d.) a normally-open switch having an upstream side connected to said first distribution line and a downstream side connected to said second distribution line;

(e.) a normally-closed first fault interrupter connected to said first distribution line between said first power load and said second power load, said first fault interrupter being operable to open when said first fault interrupter senses a downstream fault on said first distribution line;

(f.) a normally-closed second fault interrupter connected to said first distribution line between said first fault interrupter and said second power load, said second fault interrupter being operable to open when said second fault interrupter senses an upstream loss of voltage on said first distribution line;

(g.) a normally-closed third fault interrupter connected to said first distribution line between said second load and said normally-open switch, said third fault interrupter being operable to open when said third fault interrupter senses a downstream fault on said first distribution line; and (h.) a communication device communicatively connected to said third fault interrupter and said normally-open switch, said communication device being operable to send a notification signal to said normally-open switch when said third fault interrupter opens;

(i.) wherein said normally-open switch closes if said normally-open switch senses a loss of voltage on said first distribution line and said normally-open switch has not received said notification signal from said communication device; and (j.) wherein when a fault occurs in said first distribution line between said first and second power loads:
said first and second fault interrupters open;
said third fault interrupter remains closed; and
said normally-open switch closes, thereby supplying power from said second power generation source to said second power load through said third fault interrupter.

2. The power distribution system of claim 1, wherein when a second fault occurs in said first distribution line between said third fault interrupter and said normally-open switch, said third fault interrupter opens, said communication device sends a notification signal to said normally-open switch and said normally-open switch remains open.

3. The power distribution system of claim 1, wherein when a second fault occurs in said first distribution line between said third fault interrupter and said normally-open switch, said third fault interrupter opens and said normally-open switch closes.

4. The power distribution system of claim 1, further comprising a first transformer connecting said first power load to said first distribution line and a second transformer connecting said second power load to said second distribution line.

5. The power distribution system of claim 4, wherein said first and second transformers are mounted on pads and said first and second distribution lines are located underground.

6. The power distribution system of claim 1, wherein said first and second power generation sources are a common substation.

7. A power distribution system for supplying power to a plurality of power loads, said power distribution system comprising:

(a.) first and second power generation sources;

(b.) a first distribution line connected to said first power generation source, a first power load and a plurality of other power loads;

(c.) a second distribution line connected to said second power generation source;

(d.) a normally-open switch having an upstream side connected to said first distribution line and a downstream side connected to said second distribution line;

(e.) a transformer for providing power to said first load, said transformer being connected to said first load and including normally-closed first and second fault interrupters connected to said first distribution line, said transformer feeding said first load from between said first and second fault interrupters, and wherein said first fault interrupter is operable to open when said first fault interrupter senses an upstream loss of voltage on said first distribution line and said second fault interrupter is operable to open when said second fault interrupter senses a downstream fault on said first distribution line;

(f.) a normally-closed upstream fault interrupter connected to said first distribution line upstream of said transformer, said upstream fault interrupter being operable to open when said upstream fault interrupter senses a downstream fault on said first distribution line; and (g.) wherein when a fault occurs in said first distribution line between said upstream fault interrupter and said transformer:
said upstream fault interrupter and said first fault interrupter open;
said second fault interrupter remains closed;
said normally-open switch closes, thereby supplying power from said second power generation source to said transformer through said second fault interrupter; and
said other power loads are provided with power from said first power generation source.

8. The power distribution system of claim 7, wherein said transformer is mounted on a pad and said first and second distribution lines are located underground.

9. The power distribution system of claim 8, further comprising a plurality of other transformers connecting said other power loads to said first distribution line, said other transformers being mounted on pads.

10. The power distribution system of claim 7, further comprising a communication device communicatively connected to said second fault interrupter and said normally-open switch, said communication device being operable to send a notification signal to said normally-open switch when said second fault interrupter opens.

11. The power distribution system of claim 10, wherein said normally-open switch closes if said normally-open switch senses a loss of voltage on said first distribution line and said normally-open switch has not received said notification signal from said communication device.

12. The power distribution system of claim 11, wherein when a second fault occurs in said first distribution line between said second fault interrupter and said normally-open switch, said second fault interrupter opens, said communication device sends a notification signal to said normally-pen switch and said normally-open switch remains open.

13. The power distribution system of claim 7, wherein said first and second power generation sources are a common substation.

* * * * *